US008285050B2

(12) United States Patent
Ozawa

(10) Patent No.: US 8,285,050 B2
(45) Date of Patent: Oct. 9, 2012

(54) HOUSE CHANGE JUDGING METHOD AND DEVICE USING COLOR GRADATION AND ALTITUDE VALUES OF IMAGE POLYGON DATA

(75) Inventor: Atsumasa Ozawa, Tokyo (JP)

(73) Assignee: Pasco Corporation, Tokyo (JP)

( * ) Notice: Subject to any disclaimer, the term of this patent is extended or adjusted under 35 U.S.C. 154(b) by 1301 days.

(21) Appl. No.: 11/922,134

(22) PCT Filed: Jun. 21, 2006

(86) PCT No.: PCT/JP2006/312409
§ 371 (c)(1),
(2), (4) Date: Dec. 13, 2007

(87) PCT Pub. No.: WO2006/137438
PCT Pub. Date: Dec. 28, 2006

(65) Prior Publication Data
US 2009/0136090 A1    May 28, 2009

(30) Foreign Application Priority Data
Jun. 21, 2005   (JP) .................................. 2005-181217

(51) Int. Cl.
*G06K 9/46* (2006.01)
*G06K 9/00* (2006.01)
*G06T 11/20* (2006.01)

(52) U.S. Cl. .......................... 382/190; 382/113; 345/441

(58) Field of Classification Search .................... 382/190
See application file for complete search history.

(56) References Cited

U.S. PATENT DOCUMENTS

| | | | | | |
|---|---|---|---|---|---|
| 5,483,066 | A | * | 1/1996 | Sadjadi et al. | 250/338.1 |
| 5,991,769 | A | * | 11/1999 | Fino et al. | 345/619 |
| 6,092,076 | A | * | 7/2000 | McDonough et al. | 1/1 |
| 6,151,031 | A | * | 11/2000 | Atkins et al. | 345/441 |
| 6,480,270 | B1 | * | 11/2002 | Studnicka et al. | 356/141.1 |
| 6,505,186 | B1 | * | 1/2003 | Muro et al. | 707/770 |

(Continued)

FOREIGN PATENT DOCUMENTS

JP    A 9-61164    3/1997

(Continued)

OTHER PUBLICATIONS

Mar. 17, 2010 Search Report issued in European Patent Application No. 06 76 7068.7.

*Primary Examiner* — David Zarka
(74) *Attorney, Agent, or Firm* — Oliff & Berridge, PLC

(57) ABSTRACT

A house change judging method is provided for judging a change of a house in a data acquisition region based on new and old data concerning two periods, which have been aerially acquired, including: extracting as a judgment target region a predetermined region in the new data by trimming with house polygon data corresponding to a predetermined region prepared in advance; computing, after the extraction, as evaluation values, two kinds of new and old difference values between the two periods with respect to a gradation value of color image data and an altitude value of altitude data across the entire judgment target region; and judging, after the computation, based on the evaluation values, whether a house change has occurred in the judgment target region by referring to a judging table including combinations of two kinds of preset evaluation criterion values.

16 Claims, 7 Drawing Sheets

U.S. PATENT DOCUMENTS

| | | | |
|---|---|---|---|
| 2003/0172006 A1* | 9/2003 | Fino et al. | 705/27 |
| 2004/0125207 A1* | 7/2004 | Mittal et al. | 348/169 |
| 2005/0090988 A1* | 4/2005 | Bryant | 702/14 |
| 2009/0067725 A1* | 3/2009 | Sasakawa et al. | 382/190 |
| 2010/0246971 A1* | 9/2010 | Ohtsubo et al. | 382/195 |

FOREIGN PATENT DOCUMENTS

| | | |
|---|---|---|
| JP | A 2002-251618 | 9/2002 |
| JP | A 2004-117245 | 4/2004 |
| WO | WO 2004/084136 A2 | 9/2004 |

* cited by examiner

FIG.2
(a)
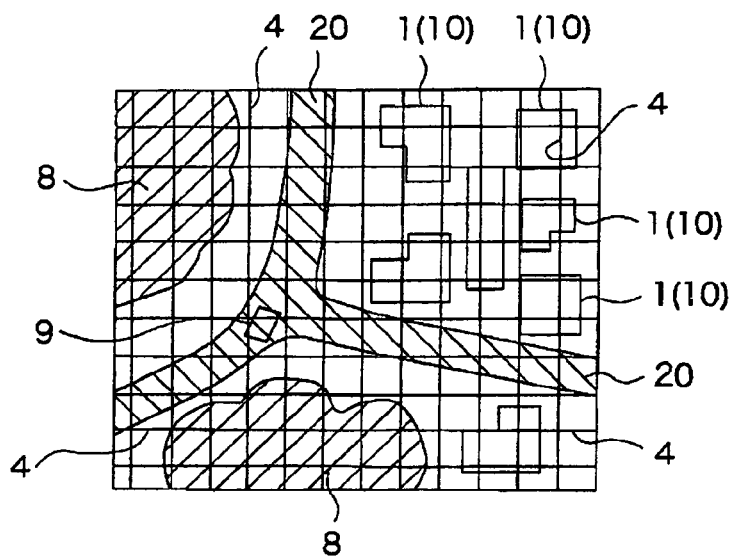
(b)
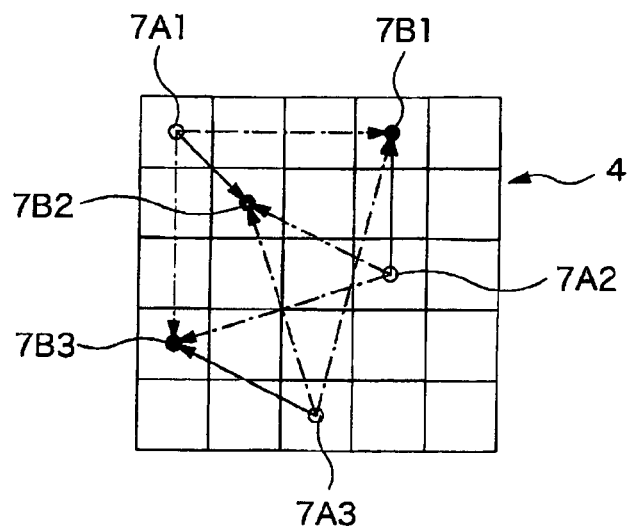
(c)
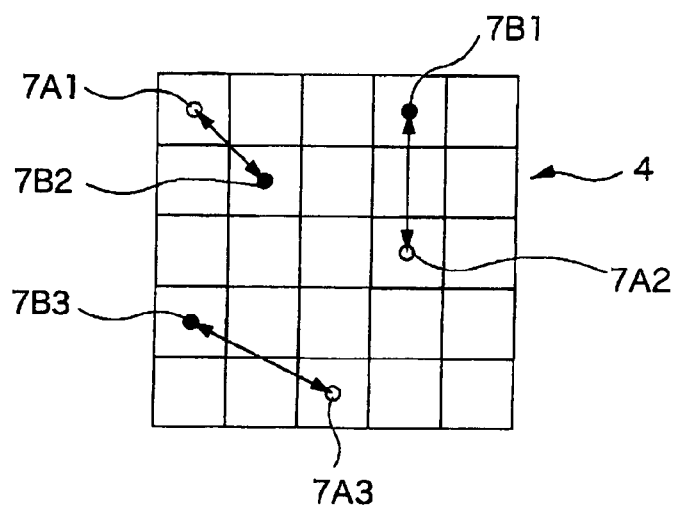

FIG.3
(a)
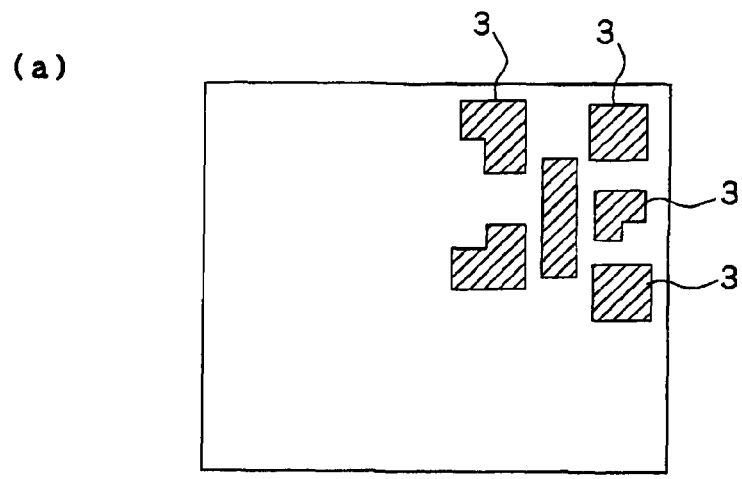
(b) 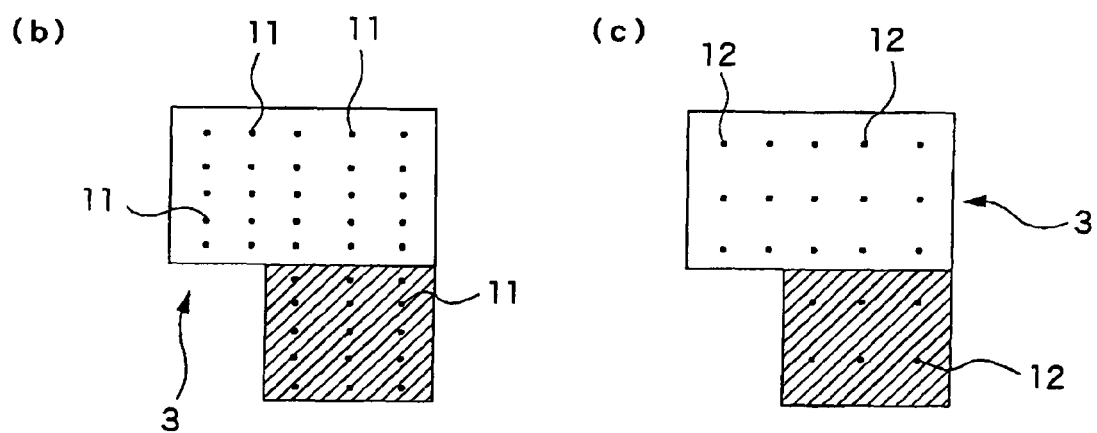 (c)
(d)
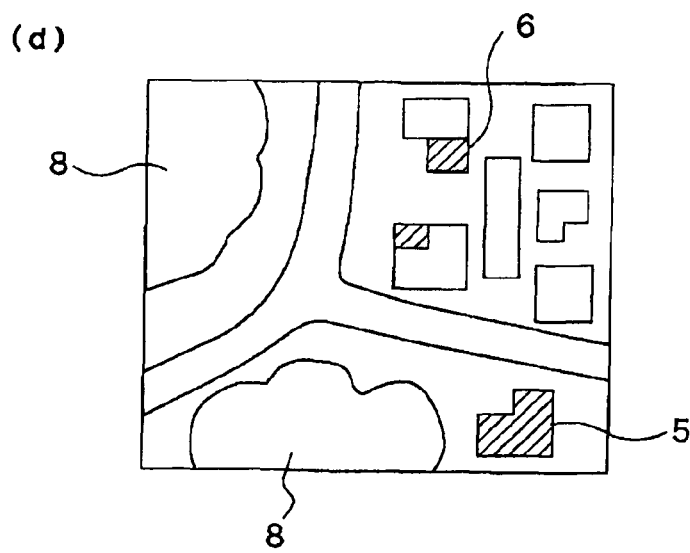

HOUSE CHANGE JUDGING METHOD AND DEVICE USING COLOR GRADATION AND ALTITUDE VALUES OF IMAGE POLYGON DATA

TECHNICAL FIELD

The present invention relates to a house change judging method and a house change judging device.

BACKGROUND ART

As a conventional art in which changes of fixed assets are judged by using an aerial survey technique, there is known a technique as disclosed in, for example, Patent Document JP 09-61164 A.

In judging changes in the conventional art, an aerial photograph image of a target region is obtained first, and by comparing the obtained aerial photograph image with that obtained a year before, changes such as new constructions and remodeled constructions are judged.

DISCLOSURE OF THE INVENTION

Problems to be Solved by the Invention

However, the conventional art has the following disadvantages. First, in aerial photograph images, all differences in shadow positions due to differences in sunshine conditions when photographing, differences in tilt of constructions due to differences in photographing points, and presence of moving objects such as people and vehicles appear on a screen as differences, thereby making it impossible to discriminate image changes due to those elements from image changes due to changes of constructions by using information on the image alone. Consequently, some human intervention is required, which leads to a difficulty in fully automating the change judgment.

In addition, because judgments on the change of houses are made based merely on color differences, judgment is not performed at all in a case of a color change equal to or smaller than color difference judgment criteria or a change not involving any color change, which leads to low precision in change judgment. In contrast, because even minute changes, such as a change in state at the time of photographing, are assumed as a change when the color difference judgment criteria are lowered, the number of occurrences of such misjudgment as incomplete change judgment, and an excessive judgment which judges a construction that has not been changed to be a change, increases, which eventually leads to a decrease in precision.

The present invention has been made to solve the above-mentioned problems, and it is therefore an object of the invention to provide a house change judging method that is high in precision in change judgment and that allows full automation in the change judgment.

Means for Solving the Problems

In addition to mere color differences, a change to a house 10 can also be determined by luminance or a ratio of color components. By determining the change in a plurality of elements using those color discriminations in combination, precision of the change judgment is considered to increase.

However, even when the number of color discrimination elements are increased, there are limitations of the change judgment with the same kinds of judgment elements. Thus, the inventor of the present invention focused on a change in height caused by the change of the house 10. By performing the change judgment using those different types of judgment elements in combination, precision thereof is significantly increased compared with the conventional art.

Further, the automation of the change judgment of the house 10 is extremely difficult since it is necessary to judge which, of the house 10 and objects other than the house 10, the change relates to among the changes.

Thus, the inventor of the present invention focused on a fact that the change judgment of the house 10 involves judging whether the house 10 has been changed during a period between a period to be compared and a judgment period, and found that the change of the house 10 during the period to be compared is categorized into a change within the house 10 and a change outside the house 10, leading to a finding that by comparing the changes between both periods with the house 10 as a change judgment unit, it is possible to judge the change of only the house 10 without judging the change of objects other than the house 10, whereby automatic judgment of the house 10 eventually becomes possible.

The present invention has been made based on the above-mentioned finding and is achieved by a house change judging method for judging a change of a house 10 in a data acquisition region based on new/old data concerning two periods, which have been aerially acquired, including: extracting as a judgment target region 1 a predetermined region in the new data by trimming with house polygon data 3 corresponding to a predetermined region prepared in advance; computing, after the extraction, as evaluation values, two kinds of new/old difference values between the two periods with respect to a gradation value of color image data 11 and an altitude value of altitude data 12 across the entire judgment target region 1; and judging, after the computation, based on the evaluation values, whether a change of the house 10 has occurred in the judgment target region 1 by referring to a judging table including combinations of two kinds of preset evaluation criterion values.

Therefore, according to the present invention, it is possible to perform judgment on a change in shape of the house 10 with higher precision by using two elements totally different in nature, such as color and height, as the change judgment elements of the house 10. In addition, it is possible to perform judgment with additionally higher precision by combining judgment element results.

Further, while the change judgment unit of the house 10 is considered as a change within the house 10, a shape of the existing house 10 (house polygon data 3) is set as a comparison unit. Because it becomes unnecessary to set the change of the construction other than the house 10 as the judgment target and to determine whether the change relates to the house 10 after the change judgment by using the house polygon data 3, full automation of the change judgment of the house 10 becomes possible.

Further, an evaluation criterion value of a color image can be obtained by a mere difference or appropriate difference of gradation values of judgment regions. However, when a color difference is judged based on the average value of differences in Pc (number of gradations of each color component)/ΣPc (sum of numbers of gradations of all color elements) between the new/old data, excessive judgment can be suppressed because a more detailed judgment criteria can be obtained by making a comparison based on ratio differences of the respective color components included in the judgment regions. Further, in addition to the evaluation criterion value of a color image, by making a comparison based on a difference of gradation values of color components in the entire judgment target region 1 between the new/old data to thereby compare luminance of each color component, excessive judgment can be suppressed because a more detailed judgment criteria can be obtained.

Further, according to another invention, there are cases where the house polygon data 3 that indicates that the house 10 is constructed on a vacant lot does not exist. In those cases, the change of the house 10 is not judged at all and only the change within the house 10 is judged, whereby judgment can only be made on limited kinds of changes. Thus, a certain region set in advance is sectioned to judge changes inside that region. In addition, in contrast to judging the change of the house 10, judgment is made on the change with the house 10 which causes relatively larger change in height, such as in a case where a house 10 is constructed on a vacant lot.

Further, prior to the change judgment by sectioning a predetermined region in regions where the house polygon data 3 cannot be used, by determining a region in which a change in height has occurred between two periods in advance and removing the determined region from the judgment region, the excessive judgment can be prevented, whereby judgment precision is enhanced.

An example case where the change in height occurs between two periods is a vegetation region 8. By discriminating and removing a plant object by appropriate methods, a change in height of the plant object is prevented from being judged as the change of the house 10. Further, the determination on the vegetation region 8 can be performed accurately by determining the vegetation region 8 using a red component (R) and a near-infrared component which are wavelengths unique to a plant and can be acquired by airplanes in the same period as altitude data 12 and the like.

In addition, an example of another object that causes the change in height is a moving object 9 which causes a temporary change in height, such as an automobile. Regarding the moving object 9 such as an automobile, by focusing on a fact that most automobiles travel on roads and by removing road regions using existing road polygon data and the like, the change in height caused by the moving object 9 is prevented from being judged as the change of the house 10 as in the case of removing plants, whereby the excessive judgment can be prevented from occurring. As a result, judgment precision is enhanced. Further, the removing of the road regions from the judgment target causes no problem because the change of the house 10 on the road as a public utility hardly occurs.

In addition, by performing the removing as pre-processing rather than as one of judgment processes, a load caused by the judgment processes can be reduced.

Effects of the Invention

According to the present invention, the judgment of the change of the house 10 can be fully automated and accurate judgment can be performed with high precision.

BRIEF DESCRIPTION OF THE DRAWINGS

FIGS. 1A to 1C are diagrams showing the present invention, in which FIG. 1A is old color image data, FIG. 1B is new color image data, and FIG. 1C is a diagram in which parts deleted in pre-processing are hatched on the color image data.

FIGS. 2A to 2C are diagrams showing change judgment in a mesh, in which FIG. 2A is a diagram having a mesh set in a wide region, FIG. 2B is a diagram selecting old characteristic points placed at minimum distances from new characteristic points, and FIG. 2C is a diagram showing distances of characteristic points selected based on the minimum distances.

FIGS. 3A to 3D are diagrams showing change judgment within house polygons, in which FIG. 3A is a diagram showing house polygons, FIG. 3B is a diagram in which RGB data in the house polygon is clipped, FIG. 3C is a diagram in which altitude data in the house polygon is clipped, and FIG. 3D is a diagram showing a result of the change judgment in the mesh together with a result of the change judgment in the house polygon.

BEST MODE FOR CARRYING OUT THE INVENTION

Figure 4:
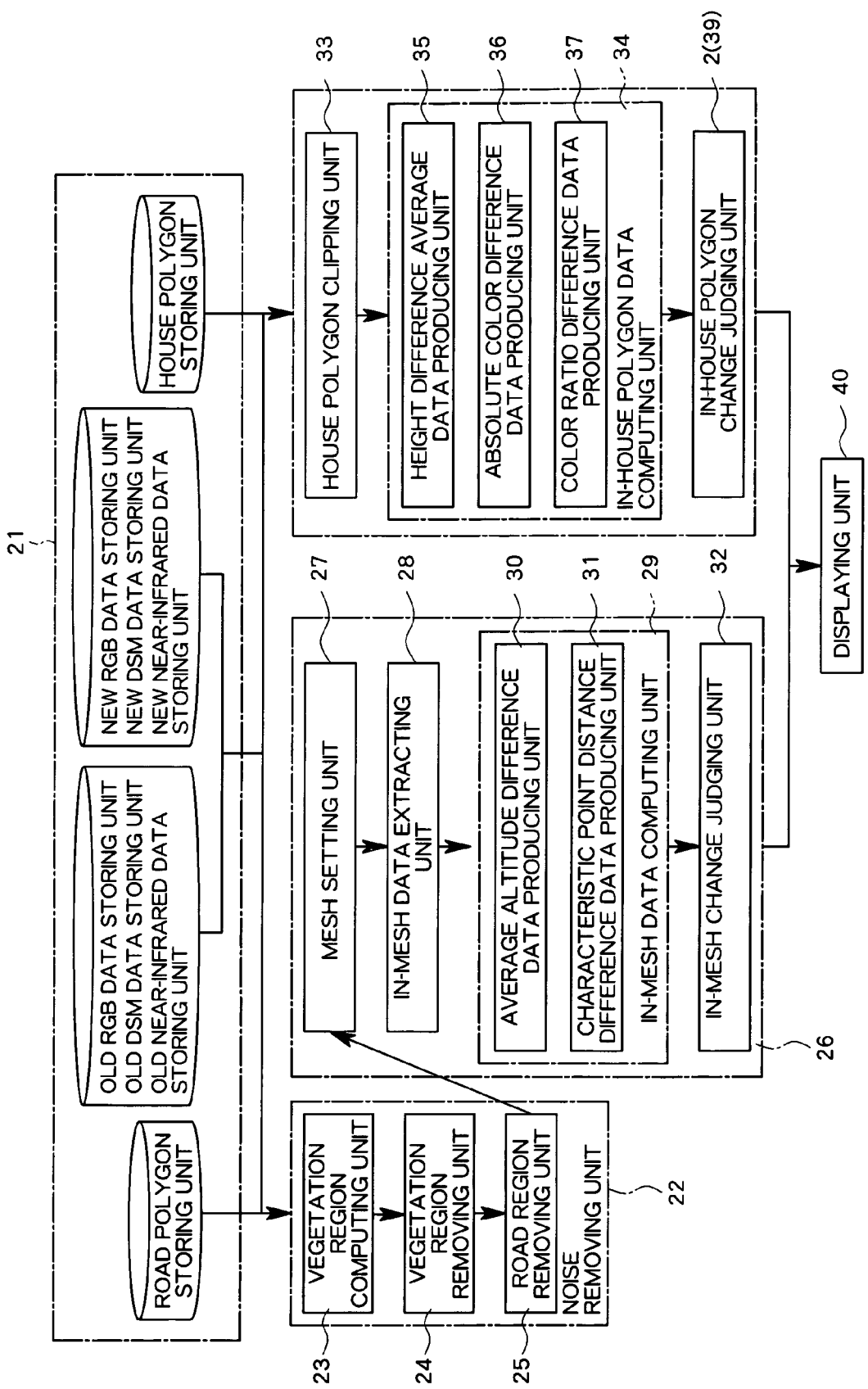
FIG. 4 is a block diagram showing the present invention.
Figure 5:
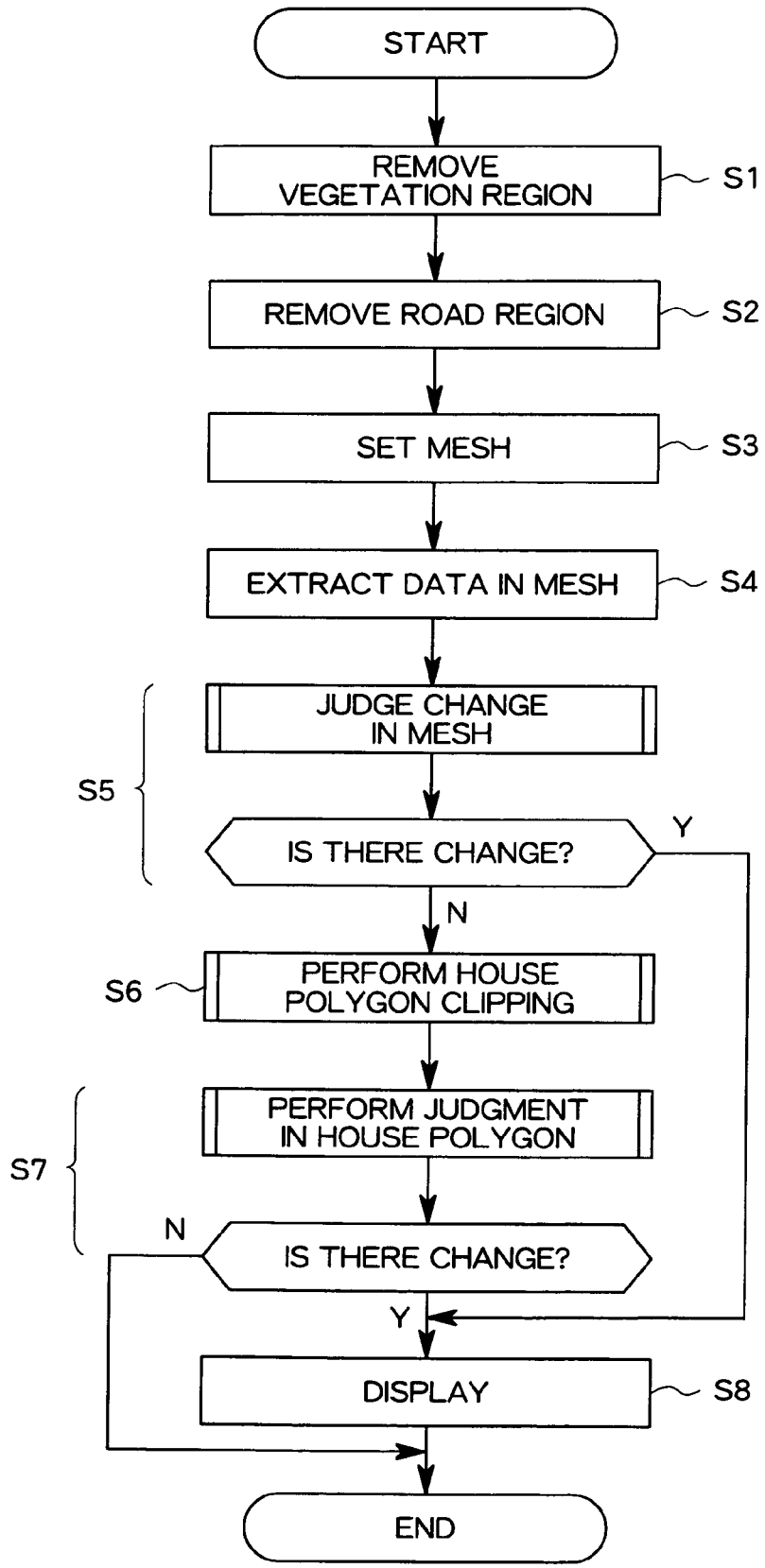
FIG. 5 is a flowchart showing a flow of overall processing.

FIG. 5 is a flowchart of the present invention and FIG. 4 shows a judging device for realizing the present invention.

First, in carrying out change judgment, a storing unit 21 stores color image data 11, altitude data 12, near-infrared data, road polygon data 20, and house polygon data 3. A description will be given by taking a method of the present invention, which involves judging a house change based on a difference between new and old data concerning an investigation year and a previous year, as an example. The color image data 11, the altitude data 12, and the near-infrared data of the two periods are prepared, and the road polygon data 20 and the house polygon data 3 of the previous year are prepared, all of which are stored in the storing unit 21.

A data acquisition region is an appropriate region including an investigation target house 10. (In the specification, an overlapped region with the house polygon data 3 to be described later is referred to as "judgment target region 1" and a relatively wide region including the judgment target region 1 is referred to as "wide judgment region". An image pickup range substantially matches the wide judgment region. Further, items of data of the investigation year and the previous year can overlap one another on a plane by a predetermined coordinate determination method.)

The color image data 11 is defined as m×n dot matrix data on color planes of three colors of R, G, and B. Each pixel is defined as a gradation value on the RGB color planes (hereinafter, a pixel value of an m-th row, n-th column of a color component c will be represented as Pc (m, n), for example, R (red) plane Pr (m, n)).

In addition, the altitude data 12 is given as a digital surface model (DSM), and may be overlapped with the color image data 11 on the plane (hereinafter, the altitude data 12 will be referred to as DSM data 12). For various kinds of polygon data, data provided by public organizations and the like can be used, and positions of those items of polygon data on a color image space can be specified by the predetermined coordinate transformation method.

Figure 1:
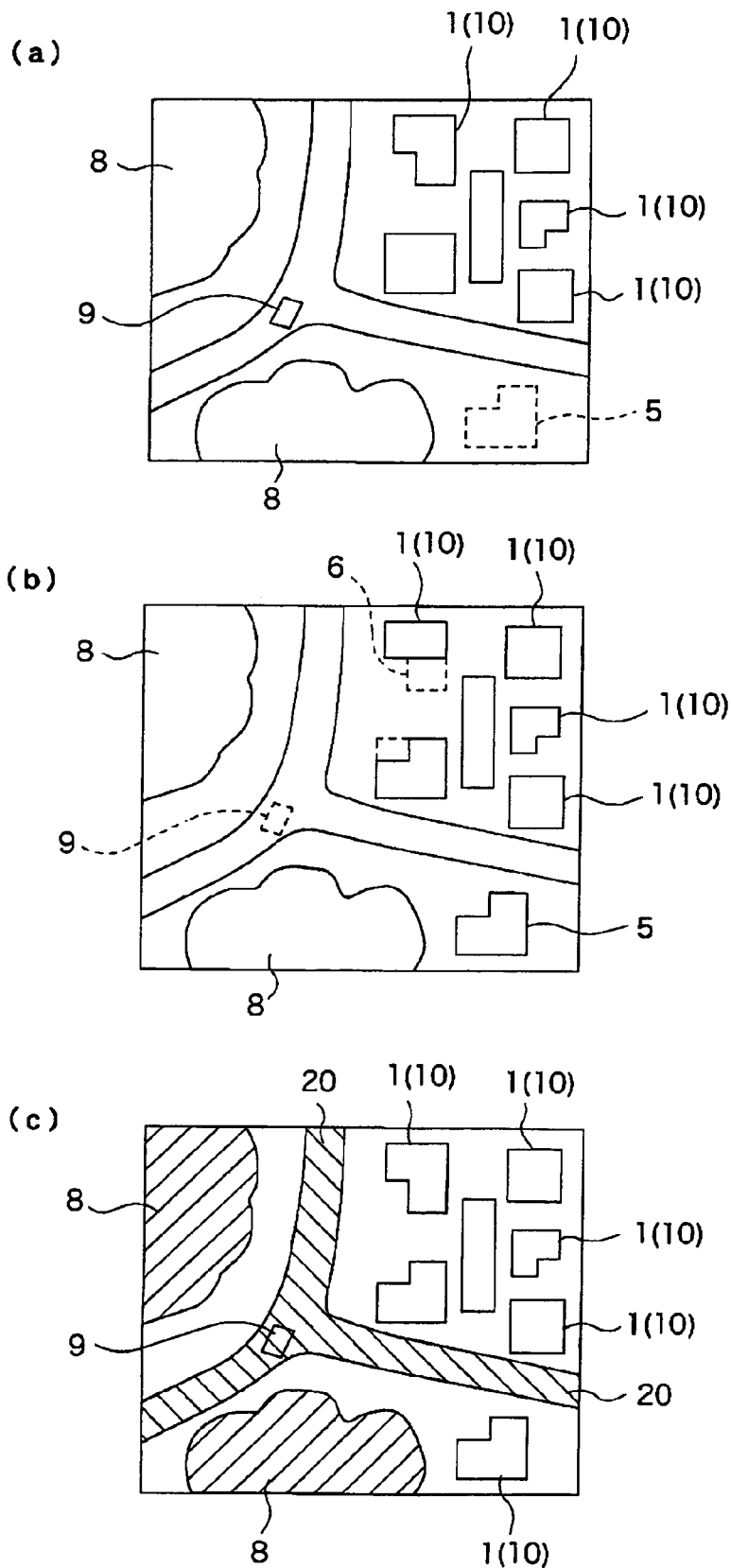

In the change judgment, pre-processing is executed in a noise removing unit 22 for removing noise parts including vegetation regions 8 and a moving object 9 such as an automobile as shown in FIG. 1C. The noise removing unit 22 includes a vegetation region computing unit 23, a vegetation region removing unit 24, and a road region removing unit 25. First, the vegetation region computing unit 23 and the vegetation region removing unit 24 execute a vegetation region removing step (step S1). The vegetation region removing step involves judging the vegetation region 8 by comparing a color value in a pixel and a set threshold by using characteristics exhibited by a plant color, and removing parts corresponding to the vegetation region 8 from the region that is used for the judgment. The vegetation region removing unit 24 calculates a normalized difference vegetation index (NDVI) value using a near-infrared value and R value of a pixel at a judgment position extracted from the storing unit 21. A specific calculation expression is shown below.

$$NDVI=(NIR-R)/(NIR+R) \quad \text{(Expression 1)}$$

Note that NIR represents the near-infrared value in a pixel.

Then, when the calculated NDVI value is equal to or larger than the preset threshold in the vegetation region removing unit 24, the region is determined as the vegetation region and is removed from the judgment target. For example, by changing the DSM data value into a negative value, the vegetation region is removed as a removal part from the computation target. As a result, the house change judgment can be carried out even when the removal parts differ between the new data and the old data, for example, when a house is constructed at a place that had been a vegetation region, and the like. Further, when the new/old removal parts overlap each other (new data: negative, old data: negative), excessive judgment does not need to be carried out by merely including processing such as avoiding normal execution of computation processing.

Next, the road region removing unit 25 executes a road region removing step (step S2). The road region removing step S2 involves removing the road region itself on which the moving object exists, from the judgment target in order to remove the moving object such as an automobile, to thereby remove the moving object. The road region removing unit 25 extracts the road polygon data 20 stored in the storing unit 21, superposes the extracted data on the DSM data from which the vegetation region has been removed, and removes the DSM data at the overlapped position from the judgment target. A removal method involves changing the value into a negative value as in the case of the vegetation region, for example. In addition, different from the vegetation, because the road does not largely change, processing in which the removed part is removed from the computation target may be executed.

After executing the pre-processing, an in-mesh change judging unit 26 executes an in-mesh change judgment including determining the judgment target region 1 in a mesh to be described later and performing the change judgment based on the DSM data 12 in the region (step S5). The in-mesh change judging unit 26 includes a mesh setting unit 27, an in-mesh data extracting unit 28, an in-mesh data computing unit 29, and a house change judging unit 32. First, the mesh setting unit 27 executes a mesh setting step (step S3). In the mesh setting step S3, the mesh setting unit 27 sets on the DSM data 12 a plurality of meshes 4 having a constant size suited for the house change judgment as shown in FIG. 2A. The size of the meshes in this embodiment is set to 5 m×5 m. Next, the in-mesh data extracting unit 28 executes an in-mesh data extracting step (step S4). The in-mesh data extracting step S4 is executed by clipping the DSM data 12 in the mesh 4 in the judgment target mesh 4.

The in-mesh data computing unit 29 carries out computation for producing an evaluation value used in the judgment from the DSM data acquired by the clipping, and includes an average altitude difference data producing unit 30 and a characteristic point distance difference data producing unit 31. The in-mesh data computing unit 29 executes an in-mesh change judging step S5. The in-mesh change judging step will be described with reference to FIG. 6. First, the average altitude difference data producing unit 30 executes an average altitude difference data producing step (step S5-1). The average altitude difference data producing step S5-1 involves obtaining an average value of the DSM data 12 clipped in the in-mesh data extracting step S4, and producing difference data between the new/old data. Specific computation is shown below.

$$\text{Average altitude difference} = |\Sigma i \Sigma j Pn(i,j)/N - \Sigma i \Sigma j Po(i,j)/N| \quad \text{(Expression 2)}$$

Note that Pn represents each pixel value of the new DSM data 12 in the mesh, Po represents each pixel value of the old DSM data in the mesh, and N represents a sum of pixels in the mesh.

Next, the characteristic point distance difference data producing unit 31 executes a characteristic point distance difference data producing step (step S5-2). As shown in FIGS. 2B and 2C, the characteristic point distance difference data producing step S5-2 involves selecting higher altitude points 7 (hereinafter, referred to as "characteristic points") (old data 7A1, 7A2, and 7A3, and new data 7B1, 7B2, and 7B3) of several higher altitude points (in this case, three points) from among the new/old DSM data (altitude data) 12 clipped in the in-mesh 4 data extracting step. Then, distances in those meshes 4, that is, distances on the plane, are calculated to select another characteristic point 7 whose distance becomes minimum with respect to a certain characteristic point 7 among the new/old data. The selection of the characteristic point 7 whose distance is minimum can be carried out through calculation based on coordinates of pixels in the mesh, for example (X-coordinate, Y-coordinate; in the figure, an upper left-hand corner is set as an origin, and the X-coordinate takes an abscissa and the Y-coordinate takes an ordinate). As shown in FIG. 2B, distances of each of the characteristic points 7B1 (1, 4), 7B2 (2, 2), and 7B3 (4, 1) with respect to the characteristic point 7A1 (1, 1) are sequentially compared to thereby select the characteristic point 7B2 having the shortest distance. Other characteristic points 7A2 and 7A3 of the new data are selected in a similar manner. By summing up the distances of the thus selected characteristic point 7B having the shortest distance with regard to the three points (7A1, 7A2, and 7A3), a characteristic point distance difference value is produced.

Figure 6:
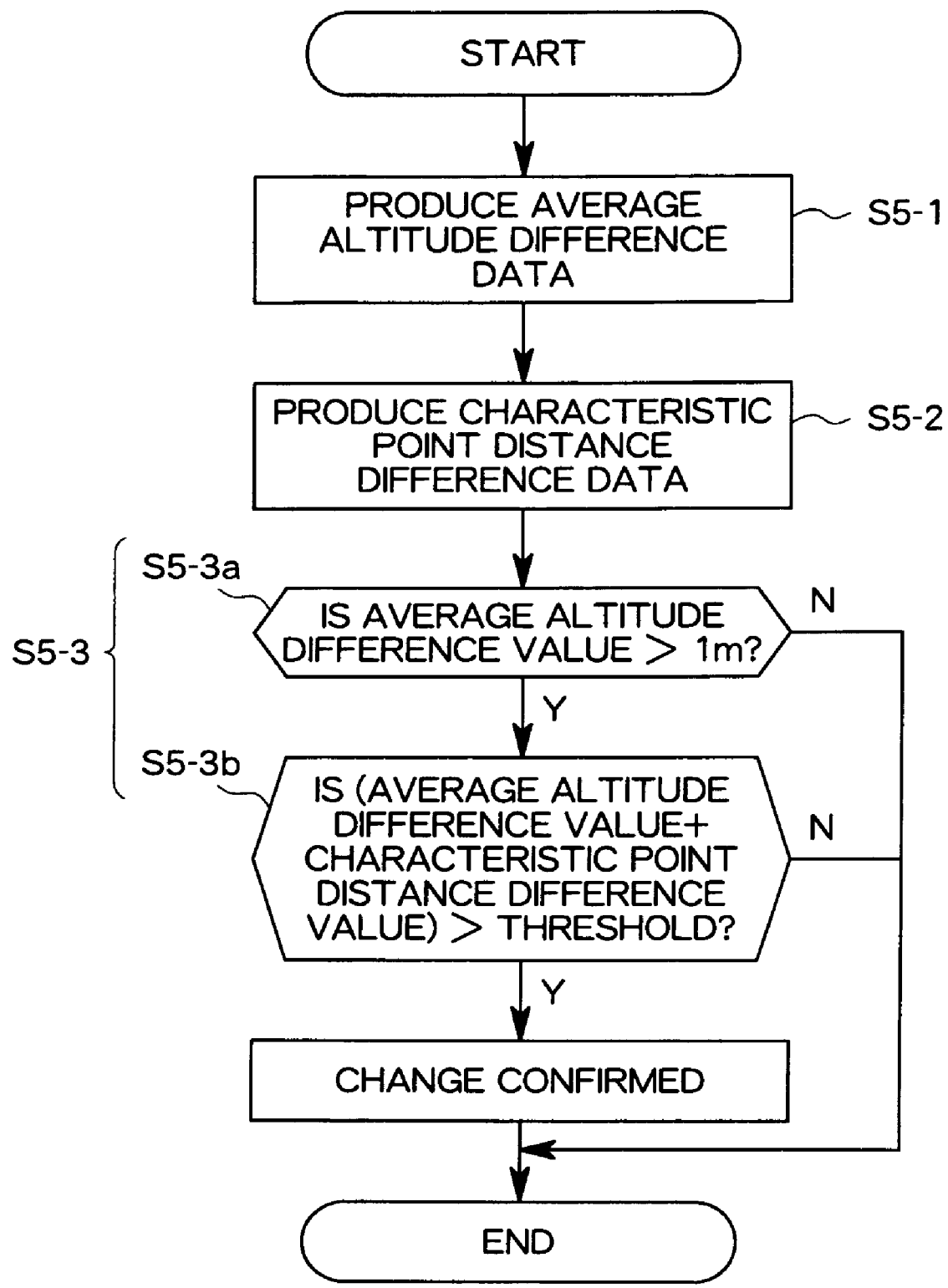
FIG. 6 is a flowchart showing the change judgment in the mesh.

Next, the in-mesh change judging unit 32 executes an in-mesh change judging step (step S5-3). The in-mesh house change judging step S5-3 involves judging the change of the house 10 based on evaluation criteria by using the data produced in the steps S5-1 and S5-2 as evaluation values. First, when the average altitude difference value produced in the step S5-1 exceeds 1 m, judgment using the characteristic point distance difference data to be described later is carried out. Further, as shown in FIG. 6, when the average altitude difference data is equal to or smaller than 1 m, it is judged that no change has been caused, and the processing is ended (step S5-3a). Next, regarding the case where the average altitude difference value exceeds 1 m, the change is judged to have occurred when a value obtained by adding the average altitude difference value to which a coefficient (0.5 in this embodiment) has been multiplied to the characteristic point distance difference value to which a coefficient (0.5 in this embodiment) has been further multiplied exceeds a threshold (1 in this embodiment) (step S5-3b). In this case, the house judged to have been changed belongs to a new construction 5, an extended construction 6, or contraction or total collapse. Further, when the value does not exceed the threshold, it is judged that the change has not occurred. Note that the coefficients respectively multiplying the average altitude difference value and the characteristic point distance difference value, and the threshold, are appropriately determined so that the change judgment of the house 10 can be performed accurately based on the actual calculation value and change result. Specifically, the values are represented as a linear combination expression in which an appropriate coefficient is multiplied by each member of (coefficient)×(average altitude difference value)+(coefficient)×(characteristic point distance difference value).

Figure 7:
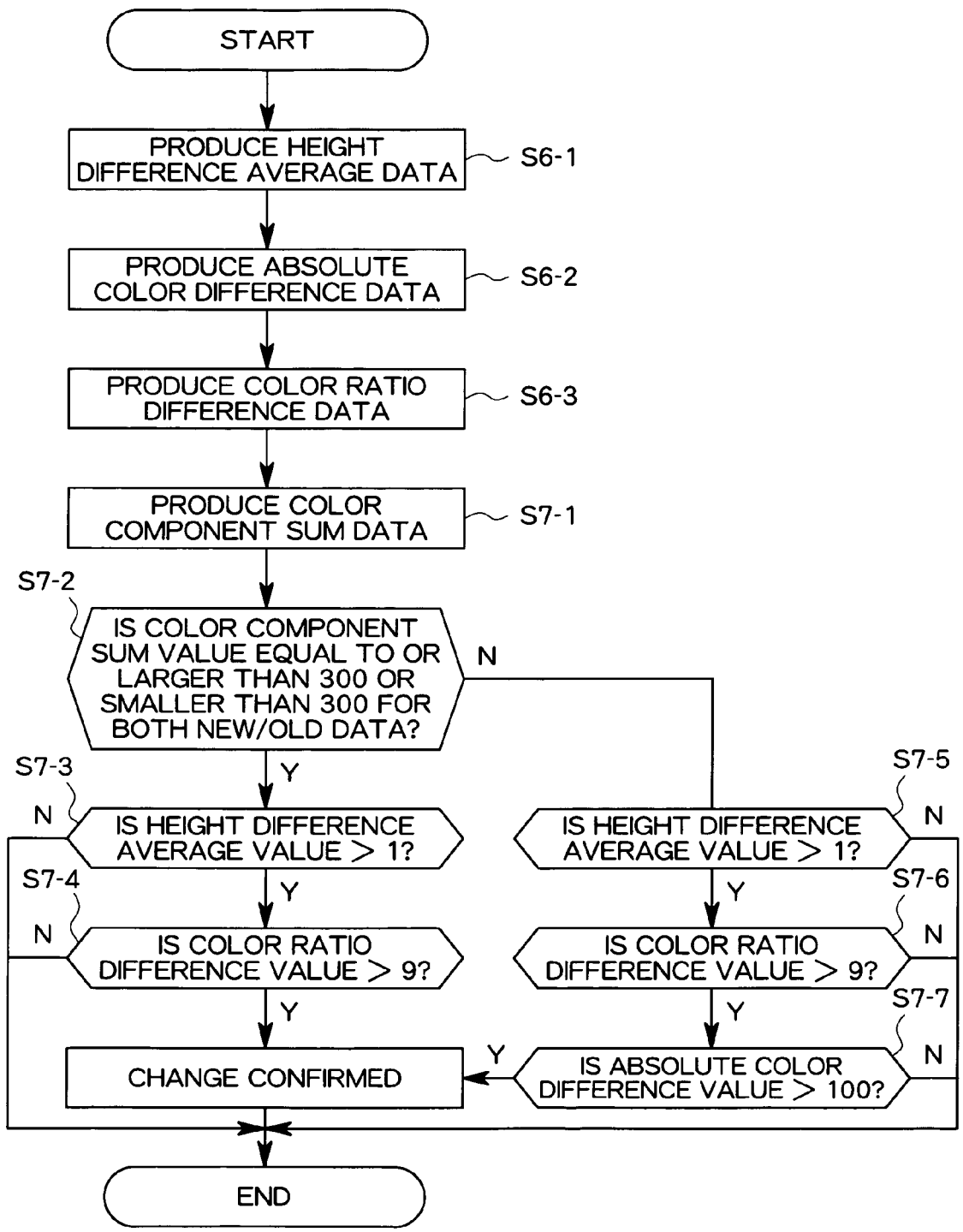
FIG. 7 is a flowchart showing the house polygon clipping and the change judgment in the house polygon.

Next, a house polygon clipping step S6 and an in-house polygon change judging step S7 are executed. Hereinafter, descriptions will be given of the house polygon clipping step S6 and the in-house polygon change judging step S7 with reference to FIGS. 5 and 7. First, a house polygon clipping unit 33 executes the house polygon clipping step (step S6). In the house polygon clipping step S6, the house polygon data 3 shown in FIG. 3A and stored in the house polygon data storing unit 21 is superposed on the new/old DSM data 12 and RGB data. Then, as shown in FIGS. 3B and 3C, the overlapped parts of the data are clipped.

Next, for producing data to be used in the judgment from the data acquired by the clipping, an in-house polygon data computing unit 34 executes the computation. The in-house polygon data computing unit 34 includes a height difference average data producing unit 35, an absolute color difference data producing unit 36, and a color ratio difference data producing unit 37. First, the height difference average data producing unit 35 executes a height difference average data producing step (step S6-1). The height difference average data producing step S6-1 involves acquiring a difference between the new/old DSM data 12 of each pixel in the house polygon data 3, and producing a height difference average value which is an absolute value of an average of the difference in the house polygon data 3. The specific computation is shown below.

$$\text{Height difference average value} = \Sigma i \Sigma j |Pn(i,j) - Po(i,j)|/N \quad \text{(Expression 3)}$$

Note that Pn represents each pixel value of the new DSM data 12 in the house polygon, Po represents each pixel value of the old DSM data 12 in the house polygon, and N represents a sum of pixels in the house polygon.

Next, the absolute color difference data producing unit 36 executes an absolute color difference data producing step (step S6-2). The absolute color difference data producing step S6-3 involves acquiring an average of each color component (hereinafter, referred to as each color element) of pixels in the new/old data, and producing an absolute color difference by summing up the absolute values of the differences of the new/old data for each color component. The specific computation is shown below.

$$DA\text{red(red wavelength absolute difference)} = |\Sigma i \Sigma j P n\text{red}(i,j)/N - \Sigma i \Sigma j P o\text{red}(i,j)/N| \quad \text{(Expression 4)}$$

$$DA\text{green(green wavelength absolute difference)} = |\Sigma i \Sigma j P n\text{green}(i,j)/N - \Sigma i \Sigma j P o\text{green}(i,j)/N| \quad \text{(Expression 5)}$$

$$DA\text{blue(blue wavelength absolute difference)} = |\Sigma i \Sigma j P n\text{blue}(i,j)/N - \Sigma i \Sigma j P o\text{blue}(i,j)/N| DA\text{red} + DA\text{green} + DA\text{blue} = \text{absolute color difference} \quad \text{(Expression 6)}$$

Note that Pn (red, green, blue) (i, j) represents each pixel value of a (red wavelength, green wavelength, blue wavelength) in the house polygon of the new RGB data, Po (red, green, blue) (i, j) represents each pixel value of a (red wavelength, green wavelength, blue wavelength) in the house polygon of the old RGB data, and N represents a sum of pixels in the house polygon.

Next, the color ratio difference data producing unit 37 executes a color ratio difference data producing step (step S6-3). The color ratio difference data producing step S6-3 involves acquiring an average value of each color component (RGB) in the house polygon data 3 shown in FIG. 3B, and obtaining the ratio of all color components. Then, the absolute value of the difference for each color component regarding the obtained new/old color component ratios is acquired to produce color ratio data by summing up the absolute differences of the color components. In this case, by removing a shadowed part from a production target because the part is not exhibiting its original color, precision is enhanced. (The shadowed part to be removed from the production target is limited to those whose values of color components are all equal to or smaller than the threshold. Note that the threshold is set to 50 in this embodiment.) The specific computation is shown below.

$$DR\text{red(red wavelength ratio difference)} = |\Sigma i \Sigma j P n\text{red}(i,j)/\Sigma i \Sigma j P n(\text{red,green,blue})(i,j) - \Sigma i \Sigma j P o\text{red}(i,j)/\Sigma i \Sigma j P o(\text{red,green,blue})(i,j)| \quad \text{(Expression 7)}$$

$$DR\text{green(green wavelength ratio difference)} = |\Sigma i \Sigma j P n\text{green}(i,j)/\Sigma i \Sigma j P n(\text{red,green,blue})(i,j) - \Sigma i \Sigma j P o\text{green}(i,j)/\Sigma i \Sigma j P o(\text{red,green,blue})(i,j)| \quad \text{(Expression 8)}$$

$$DR\text{blue(blue wavelength ratio difference)} = |\Sigma i \Sigma j P n\text{blue}(i,j)/\Sigma i \Sigma j P n(\text{red,green,blue})(i,j) - \Sigma i \Sigma j P o\text{blue}(i,j)/\Sigma i \Sigma j P o(\text{red,green,blue})(i,j)|$$

$$DR\text{red} + DR\text{green} + DR\text{blue} = \text{color ratio difference} \quad \text{(Expression 9)}$$

Note that Pn (red, green, blue) (i, j) represents each pixel value (of a red wavelength, green wavelength, blue wavelength) in the house polygon of the new RGB data, Po (red, green, blue) (i, j) represents each pixel value (of a red wavelength, green wavelength, blue wavelength) in the house polygon of the old RGB data, and N represents a sum of pixels in the house polygon.

Next, an in-house polygon change judging unit 39 executes an in-house polygon change judging step (Step S6-5). In the in-house polygon change judging step S7, the change judgment of the house 10 is carried out based on the evaluation criteria while referring to a judging table 2 with the data produced in the steps S6-1 to S6-3 as evaluation values. Further, a color component sum data producing unit executes a color component sum data producing step (step S7-1). The color component sum data producing step S7-1 involves producing color component sum data which is a sum of the color components for each new/old data.

Prior to the judgment, the new/old color component sum data produced in the step S7-1 is classified in terms of cases. There are two types of cases in the classification, that is, a case where both the new/old color component sum data are equal to or larger than, or smaller than, the set threshold (300 in this embodiment), and a case where the new color component sum data and the old color component sum data are different from each other on both sides of the threshold (new data is equal to or larger than 300 and old data is smaller than 300, or the new data is smaller than 300 and the old data is equal to or larger than 300). The judgment is carried out using the following evaluation criteria based on the classification (step S7-2).

First, when both the new and old color component sum data are equal to or larger than, or smaller than, the set threshold (300 in this embodiment), the house change judging unit 39 uses the height difference average value and the color ratio difference value as the evaluation criteria to carry out judgment using the following judging table 2. It is judged that the change has occurred only when the height difference average value exceeds the set threshold (1 in this embodiment) (step S7-3) and the color ratio difference value exceeds the set threshold (9 in this embodiment) (step S7-4). On the other hand, it is judged that the change has not occurred when any of the evaluation criteria is equal to or smaller than the set threshold.

In contrast, when the new and old color component sum values are different from each other on both sides of the threshold, the judgment is carried out using the following judging table 2, and the absolute color difference is further added as an evaluation criterion. It is judged that the change has occurred only when the other evaluation criteria exceed the threshold (steps S7-5 and S7-6) and the absolute color difference value exceeds the set threshold (100 in this embodiment) (step S7-7). Further, it is judged that the change has not occurred when any of the evaluation criteria is equal to or smaller than the set threshold.

The house judged as having been changed in the in-house polygon change judgment as a result of the judgment is an in-house newly-remodeled construction, a house in the midst of construction, or an extended and reconstructed house.

Further, it is possible to perform the in-house polygon change judgment for judging the change in a house before the in-mesh change judgment to remove parts judged as having been changed from the in-mesh change judgment target, or to remove in advance the house polygon data 3 from the in-mesh change judgment target as in the noise processing using the house polygon data 3, whereby it is sufficient to perform judgment on only the meshes other than those of house parts, and the time required for the processing is accordingly shortened due to the reduction in judgment target.

Next, a displaying unit 40 executes a displaying step based on the judgment result (step S8). The displaying step S8 involves displaying a preset content based on the judgment result as shown in FIG. 3D. For example, only parts judged as having been changed are displayed, or the changed parts are displayed with emphasis using a different color.

Note that the display may be performed at the time when the change judgment in the mesh 4 is carried out. In addition, the in-house polygon change judgment may preferentially be displayed when both the in-mesh change judgment and the in-house polygon change judgment are carried out with respect to the parts subjected to the change judgment, for example. Further, the methods described above can be realized by a computer that executes programs for sequentially executing processes of the step S1 and the subsequent steps.

The invention claimed is:

1. A house change judging method for judging a change of a house in a data acquisition region based on new data and old data concerning two periods, which have been aerially acquired, comprising:
   extracting as a judgment target region a predetermined region in the new data and the old data concerning the two periods by trimming with house polygon data corresponding to a predetermined region prepared in advance;
   computing, after the extraction, as evaluation values, two kinds of difference values between the new data and the old data concerning the two periods with respect to a gradation value of color image data and an altitude value of altitude data across the entire judgment target region, the computing being performed by a microprocessor and the altitude data being obtained from a digital surface model; and
   judging, after the computation, based on the evaluation values, whether a house change has occurred in the judgment target region by referring to a judging table including combinations of two kinds of preset evaluation criterion values, the judging being performed by a microprocessor.

2. The house change judging method according to claim 1, wherein an evaluation value with respect to the gradation value of the color image data is given as an average value of differences between the new data and the old data:

$$Pd/\Sigma Pc$$

where Pc represents the number of gradations of each color element (c), and $\Sigma Pc$ represents a sum of numbers of gradations of all color elements.

3. The house change judging method according to claim 1, wherein an evaluation value with respect to the gradation value of the color image data is given as a difference of gradation values of color components in the entire judgment target region between the new data and the old data.

4. The house change judging method according to claim 1, further comprising:
   computing, with respect to the new data and the old data, an evaluation luminance value defined based on a sum of gradation values of each color component, for determining a luminance range sectioned by a predetermined boundary value, prior to the judgment using the judging table,
   when the new data and the old data belong to the same luminance range, a first evaluation value given as an average value of differences between the new data and the old data:

$$Pc/\Sigma Pc$$

where Pc represents the number of gradations of each color element (c), and $\Sigma Pc$ represents a sum of numbers of gradations of all color elements, is used with respect to the color image data; and
   when the new data and the old data belong to different luminance ranges, both the first evaluation value and a second evaluation value given based on a difference of the gradation values of color components in the entire judgment target region between the new data and the old data are used with respect to the color image data.

5. The house change judging method according to claim 1, further comprising:
   setting predetermined meshes in a wide judgment region containing the judgment target region;
   setting, after the setting of the meshes, a mesh altitude judgment value with an altitude value difference as a standard to each of the meshes, the mesh altitude judgment value and the altitude value difference being obtained from a digital surface model;
   judging whether a house change has occurred in the wide judgment region based on the mesh altitude judgment value; and
   judging a change based on a logical sum of a judgment result in the judgment target region and a judgment result in the wide judgment region.

6. The house change judging method according to claim 5, further comprising:
   removing in advance, a vegetation region from a computation target prior to the judgment in the judgment target region or the judgment in the wide judgment region.

7. The house change judging method according to claim 5, further comprising:
   removing in advance a moving object from a computation target prior to the judgment in the judgment target region or the judgment in the wide judgment region.

8. A house change judging method for judging a change of a house in a data acquisition region based on new data and old data concerning two periods, which have been aerially acquired, comprising:

setting predetermined meshes in a judgment target region in the new data and the old data concerning two periods;

setting, after the setting of the predetermined meshes, a mesh altitude judgment value with an altitude value difference as a standard to each of the predetermined meshes; and judging whether a house change has occurred in a judgment region based on the mesh altitude judgment value, wherein the mesh altitude judgment value is given as a linear combination value of a difference in altitude average in a mesh between the new data and the old data and an evaluation value based on a difference in distance of an appropriate number of higher altitude points between the new data and the old data extracted in a mesh that is the same between the new data and the old data.

9. A house change judging device for judging a change of a house in a data acquisition region based on new data and old data concerning two periods, which have been aerially acquired, comprising:

judgment target region extracting means for extracting as a judgment target region a predetermined region in the new data and the old data concerning the two periods by trimming with house polygon data corresponding to a predetermined region prepared in advance;

evaluation value computing means for computing as evaluation values two kinds of difference values between the new data and the old data concerning the two periods with respect to a gradation value of color image data and an altitude value of altitude data across the entire judgment target region; and judging means for judging, based on the evaluation values, whether a house change has occurred in the judgment target region by referring to a judging table including combinations of two kinds of preset evaluation criterion values.

10. The house change judging device according to claim 9, wherein an evaluation value with respect to the gradation value of the color image data is given as an average value of differences between the new data and the old data:

$$Pc/\Sigma Pc$$

where Pc represents the number of gradations of each color element (c), and ΣPc represents a sum of numbers of gradations of all color elements.

11. The house change judging device according to claim 9, wherein an evaluation value with respect to the gradation value of the color image data is given as a difference of gradation values of color components in the entire judgment target region between the new data and the old data.

12. The house change judging device according to claim 9, further comprising evaluation luminance value computing means for computing, with respect to the new data and the old data, an evaluation luminance value defined based on a sum of gradation values of each color component, for determining a luminance range sectioned by a predetermined boundary value, when the new data and the old data belong to the same luminance range, the judging means uses a first evaluation value given as an average value of differences between the new data and the old data:

$$Pc/\Sigma Pc$$

where Pc represents the number of gradations of each color element (c), and ΣPc represents a sum of numbers of gradations of all color elements, with respect to the color image data; and when the new data and the old data belong to different luminance ranges, the judging means uses both the first evaluation value and a second evaluation value given based on a difference of the gradation values of color components in the entire judgment target region between the new data and the old data with respect to the color image data.

13. The house change judging device according to claim 9, further comprising:

mesh setting means for setting predetermined meshes in a wide judgment region containing the judgment target region;

mesh altitude judgment value setting means for setting a mesh altitude judgment value with an altitude value difference as a standard to each of the meshes; and wide judging means for judging whether a house change has occurred in the wide judgment region based on the mesh altitude judgment value, the judging means judges a change based on a logical sum of a judgment result in the judgment target region and a judgment result in the wide judgment region.

14. The house change judging device according to claim 13, which causes a computer to execute the step of removing in advance a vegetation region from a computation target prior to the judgment.

15. The house change judging device according to claim 13, which causes the computer to execute the step of removing in advance a moving object from the computation target prior to the judgment.

16. A house change judging device for judging a change of a house in a data acquisition region based on new data and old data concerning two periods, which have been aerially acquired, comprising:

mesh setting means for setting predetermined meshes in a judgment target region in the new data and the old data concerning two periods;

mesh altitude judgment value setting means for setting a mesh altitude judgment value with an altitude value difference as a standard to each of the predetermined meshes; and judging means for judging whether a house change has occurred in a judgment region based on the mesh altitude judgment value, wherein the mesh altitude judgment value is given as a linear combination value of a difference in altitude average in a mesh between the new data and the old data and an evaluation value based on a difference in distance of an appropriate number of higher altitude points between the new data and the old data extracted in a mesh that is the same between the new data and the old data.

* * * * *

UNITED STATES PATENT AND TRADEMARK OFFICE
CERTIFICATE OF CORRECTION

PATENT NO. : 8,285,050 B2
APPLICATION NO. : 11/922134
DATED : October 9, 2012
INVENTOR(S) : Atsumasa Ozawa Page 1 of 1

It is certified that error appears in the above-identified patent and that said Letters Patent is hereby corrected as shown below:

In the Claims:

In col. 10, Claim 2, lines 5-6, please delete "Pd/ΣPc" and replace with "Pc/ΣPc".

Signed and Sealed this
Twenty-fifth Day of December, 2012

David J. Kappos
*Director of the United States Patent and Trademark Office*